April 2, 1968
H. ZIMMERMANN
3,376,003
PIPE CLAMP
Filed Nov. 29, 1965
3 Sheets-Sheet 1
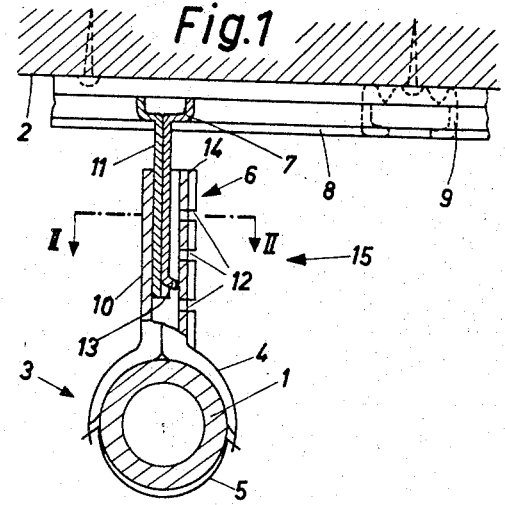
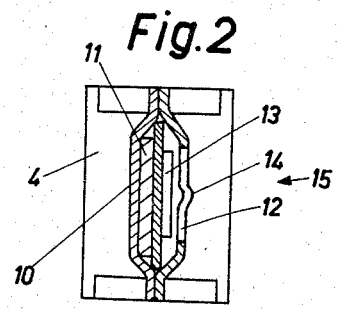
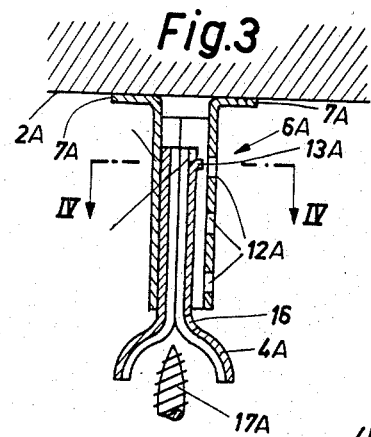
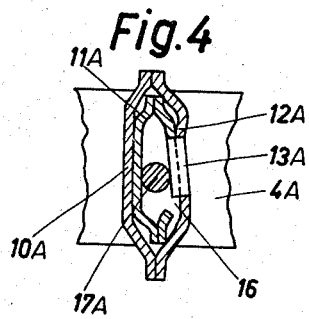
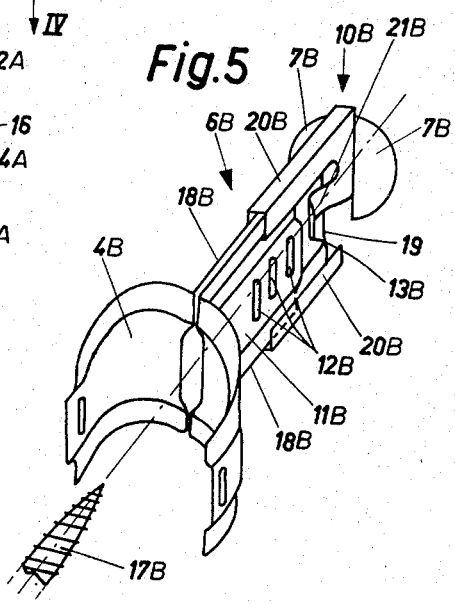
INVENTOR.
HANS ZIMMERMANN
BY
ATTORNEYS

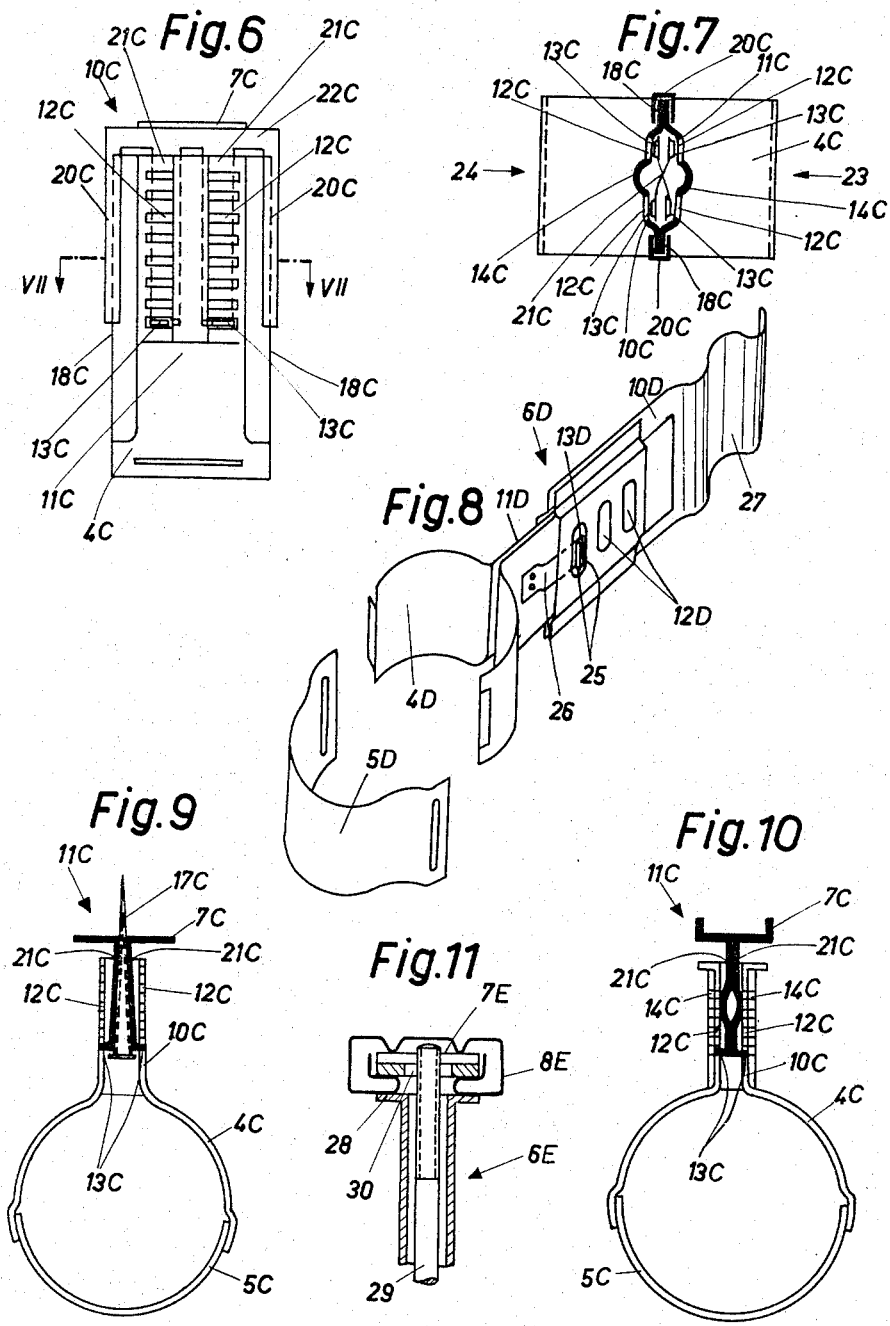

April 2, 1968 H. ZIMMERMANN 3,376,003
PIPE CLAMP
Filed Nov. 29, 1965 3 Sheets-Sheet 3
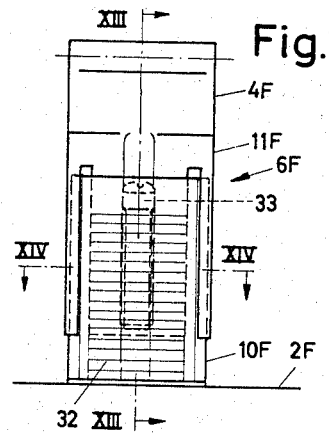
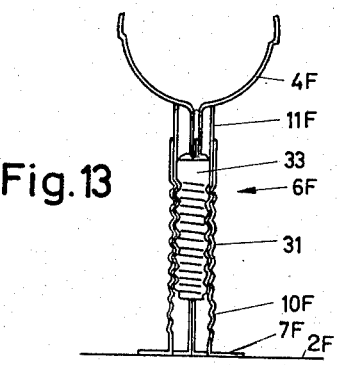
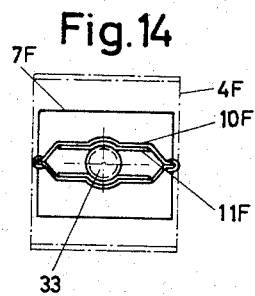
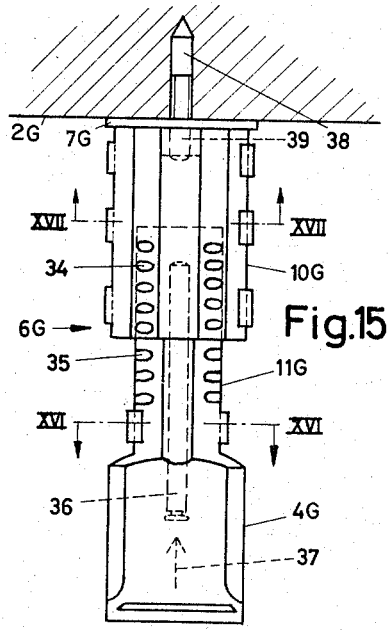
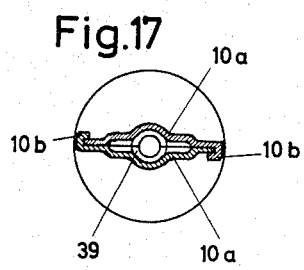
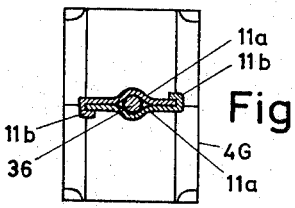
INVENTOR.
HANS ZIMMERMANN
BY
ATTORNEYS United States Patent Office 3,376,003
Patented Apr. 2, 1968

3,376,003
PIPE CLAMP
Hans Zimmermann, Langentalstrasse 60–66,
Geislingen an der Steige, Germany
Filed Nov. 29, 1965, Ser. No. 510,173
Claims priority, application Germany, Dec. 1, 1964,
L 11,206
7 Claims. (Cl. 248—59)

ABSTRACT OF THE DISCLOSURE

A pipe clamp having a radially extending hanger adapted to be connected to a supporting surface. The hanger includes a pair of support parts which are telescopically positioned one within the other and, in the normal condition thereof, are relatively movable one within the other. The one support part is provided with apertures therein while the other support part is provided with a fastening projection adapted to be received within one of said apertures. Deformation of one of said parts causes the projection to be received within one of the apertures for fixedly fastening said first and second parts relative to each other.

---

The invention relates to a pipe clamp having a radially extending hanger, said hanger being movable toward a supporting surface by means of a fastening device and comprising at least two telescopingly movable support parts, said latter being provided with cooperating means for fastening same in selected positions. Said last-named means consist of fastening apertures in the wall of one of the support parts together with at least one fastening projection in a wall in the other support part adjacent said first-named wall.

The fastening apparatus of one known pipe clamp of the above-named type consists of support projections in the form of claws in the end of a leaf spring, the same constituting elongations of a wall of one support part which is adjacent to a wall of the other support part and provided with fastening apertures. Since the claws upon adjustment of the telescopically movable support parts enter into each part of the fastening openings moving there past, the adjustment of such a unit becomes difficult and slow. Further there exists the danger that upon a substantial strain occurring in the pipe clamp the claws will become bent whereby the spring tongue will escape out of the fastening apertures.

There is also in the prior art a pipe clamp with tubular shape and telescopingly movable support parts whose fastening with respect to each other is brought about through cone means. Said cone means is drawn into a tubular bore in the inner support means by means of a screw acting in the direction of the clamp structure and causes said inner support part to provide a strong reinforcement against the outer supporting part. Such a frictional clamping of the two support parts is nevertheless not effective to prevent relative slipping upon a substantial strain being applied thereto. Further such clamping apparatus for a pipe clamp is not only expensive but also temperature sensitive so that upon the mounting of the pipe in the desired place on a supporting surface at a desired spacing therefrom, the desired mechanical statbility is not always to be relied upon.

The purpose of the invention is to provide a pipe clamp of a foregoing-named type which is easily constructed, which by its great mechanical stability assures that a pipe can be brought into its desired location on a supporting surface with the desired spacing therefrom. This, according to the invention, is accomplished by providing walls carrying fastening apertures and a fastening projection which walls are adjacent each other but somewhat spaced from each other and at least one of these walls is deformable in the direction of the other to effect an entering of the fastening projection into the fastening aperture.

The pipe clamp according to the invention is simple to manufacture and assures upon the engagement of the fastening projection in a fastening aperture a mechanically strong connection between the pipe and the supporting surface which is independent of temperature variations.

Further features and advantages of the invention may be derived from the following description in connection with the accompanying drawings which set forth one illustrative embodiment of a pipe clamp constructed according to the invention.

In the drawings:

FIGURE 1 shows a partial sectional view of a pipe clamp which is connected to a supporting surface by means of a carrier extending transversely to the lengthwise direction of the pipe;

FIGURE 2 is a sectional view taken on line II—II of FIGURE 1;

FIGURE 3 is a cross-sectional view through a modified embodiment of a pipe clamp according to the invention;

FIGURE 4 is a section taken along the line IV—IV of FIGURE 3;

FIGURE 5 is a schematic perspective illustration of a preferred embodiment of the pipe clamp according to the invention;

FIGURE 6 is a side view of a pipe clamp constructed similarly to the embodiment of FIGURE 5;

FIGURE 7 is a section taken along the line VII—VII of FIGURE 6;

FIGURE 8 is a schematic illustration of a further modified embodiment of a pipe clamp according to the invention;

FIGURES 9 and 10 illustrate pipe clamps similar to those shown in FIGURES 6 and 7;

FIGURE 11 is a pipe clamp similar to that shown in FIGURE 3 with a radially extending hanger capable of fastening to a carrier rod;

FIGURE 12 is a side view similar to that of FIGURE 6;

FIGURE 13 is a section along the line XIII—XIII of FIGURE 12;

FIGURE 14 is a section along the line XIV—XIV of FIGURE 12;

FIGURE 15 is a side view of a pipe clamp similar to that of FIGURE 12 but with the support means comprising two identical cooperating halves;

FIGURE 16 is a section along the line XVI—XVI of FIGURE 15; and

FIGURE 17 is a section along the line XVII—XVII of FIGURE 15.

In the following description, the corresponding parts of the various embodiments of the invention will be referred to by the same reference numerals with the suffix A, B, C, D, E, E, F or G added thereto.

As illustrated in FIGURE 1, a pipe clamp finds use for mounting a pipe 1 onto a said supporting surface 2, said pipe clamp consisting of two cylindrical formed half shells 4 and 5 of which one, such as the half shell 4 has a radially extending hanger 6 mounted thereon. The hanger 6 has on the end thereof remote from said half shell a fastening means, for example, in the form of a planar foot 7 which in the embodiment of FIGURE 1 is constructed as a part of a bayonet joint device and which forms a bayonet joint in cooperation with the undercut cross-sectional profile 9 of a carrier rod 8 which is fastened to the supporting surface 2 in a direction crosswise to the length of the pipe. The radially extending support 6 consists of two telescoping components 10 and 11 adjustable with respect to each other which are arranged for fastening to each other by fastening apparatus in the form of apertures 12 cooperable with at least one projection 13.

The apertures 12 are arranged in one wall of the hanger component 10 while the projection 13 projects toward the aperture 12 from the wall adjacent said one wall in the inner hanger component 11. These respectively adjacent walls of the hanger components 10 and 11 are spaced from each other whereby the wall of the hanger component 10 is deformable in order to accomplish the fastening of the one part to the other. The deformability can, for example, be accomplished by having said wall provided with a radially extending offset 14 (see also FIGURE 2). The half shell 4 and the hanger component arranged thereon can be constructed in two parts for example, in the form of two shaped sheets fastened to each other by spot welding.

As one will understand best from FIGURE 2, the support components 10 and 11 are constructed as shaped parts telescopically movable in and out with respect to each other. By means of the illustrated construction of the hanger which extends lengthwise in the direction of pipe 1 there is obtained an effective mechanical fastening of the radially extending hanger 6 holding same against movement in this direction. If the hanger portion 10 is further provided, as also shown in FIGURE 2, with a closed frame profile there is obtained a distorted cross section perpendicular to the lengthwise direction of pipe. The radial support 3 is adjusted to a desired length by the adjustment of the hanger parts 10 and 11 with respect to each other whereby the projection 13 is brought into alignment with the adjacent aperture 12 and the wall of the hanger component 10 adjacent to the projection 13 is deformed in the direction of the arrows 15. Such deformation can be accomplished in a simple manner by the drawing together of the appropriate portions of the hanger component 10 by means of plier whereby the wall spaced from the wall opposite to the projection 13 is scarcely deformed at all and the wall adjacent thereto is in consequence of the weakening of the materail by the aperture 12, together with the offset 14, is deformed sufficiently to permit the entry of the projection 13 in the direction of the arrows 15 into the corresponding aperture 12. In the description thus far, it is apparent that the part according to the invention provides in a simple manner for the possibility of mounting pipes at different spacings with respect to a supporting surface. If the pipe clamp is further provided, according to FIGURE 1, with a planar foot which provides a bayonet fastening in cooperation with a carrier rod which can be brought toward the supporting surface in a direction transversely of the lengthwise direction of the pipe there, there is provided a further great advantage that its pipe clamp is adjustable in two directions, namely perpendicularly and parallel with the supporting surface. The planar foot 7, before the closing of the bayonet lock, is freely movable lengthwise of the carrier rod 8 in the profile 9 thereof and it then is made fast in a desired position with respect to the carrier rod 8 by a rotation of 90° around the lengthwise axis of the hanger 6.

In the embodiment of the hanger 6A according to FIGURES 3 and 4, there is provided for both the hanger component 10A as well an hanger component 11A, a hollow profile having closed edges whereby nevertheless the inner support component 11A is constructed integrally with the half shell 4A out of two formed sheets fastened to each other. The wall of the inner support component 11A carrying the projection 13A is provided with a slot 16 therethrough for facilitating the deforming thereof.

Advantageously a screw 17A is provided in this embodiment as a fastening device which extends in a radial direction from the clamp side into the hollow space of the support component 11A. By the correct choice of diameter for the screw 17A there is obtained upon entry of said screw into the inner component 11A, according to FIGURE 4, a bending of the wall carrying the projection 13A sufficient to effect the entry of the projection 13A into the aperture 12A adjacent thereto in the adjacent wall of the support component 10A. The screw 17A must be sufficiently long that it extends through the length of the support 6A and also sufficiently into the supporting surface 2A to assure a safe engagement of the planar-shaped feet 7A onto the supporting surface 2A.

In the embodiment of the pipe clamp according to FIGURE 5 only the inner support component 11B is constructed with a closed profile, and same is provided at its narrow side with flanges 18B. The outer hanger component 10B consists of wall 19 embracing the tubular profile at its long side and said wall 19 is provided at its radial edges with gripping channels 20B which provide a stable engagement with the flange 18B. The wall of the outer support component 10B carrying the projection 13B is connected with the wall 19 and is constructed in the form of a distortable tongue 21B which upon interengagement of the flange 18B and receiving channel 20B is interable into the interior of the inner hanger component 11B. After the projection 13B is brought into register with the aperture 12B corresponding to the desired length of the hanger 6B, the distortion of the tongue 21B for the purpose of engagement of the projection 13B can be accomplished by a screw 17B which is introduced in an already described manner radially into the interior of the support part 11B and effects fastening of the hanger 6B onto a supporting surface. Should, however, the planar foot 7B of the outer hanger part 10B be connected with the supporting surface through other fastening means (not shown), then the distortion of the tongue 21B can be obtained by a screw driver or a similar appropriate tool, introduced into the interior of the hanger 6B.

The pipe clamp set forth in FIGURES 6 and 7 is provided similarly to that of FIGURE 5 with an inner hanger component 11C having a closed tubular profile with flanges 18C. The outer hanger component 10C consists of gripping channels 20C and a back wall 22 connected to said channels. On the back wall 22 there are arranged four distortable tongues 21C which are arranged schematically with respect to each other and each of which carry projections 13C. The hanger part 11C is provided at the wall adjacent said tongues with four rows of apertures 12C corresponding to the number of tongues.

In this embodiment of the pipe clamp, the interengagement of the hanger parts can be accomplished through deforming of the lengthwise side of the hanger parts 11C in the direction of the arrows 23 and 24 (FIGURE 7) for which purpose the lengthwise sides are provided with offsets 14C.

Pipe clamps with several projections 13C as compared to those shown in FIGURES 6 and 7 are set forth in FIGURES 9 and 10. In these figures similarly functioning parts are designated with the same reference characters.

There exists also the possibility of building the projection 13D, as shown in FIGURE 8, with wedge-forming surfaces 25 extending in a direction toward the apertures 12D and of fastening same to the wall of the inner hanger component 11D which is adjacent the apertures 12D by means of a leaf spring 26. Such a construction of the pipe clamp has the advantage that upon obtaining of the desired length for the hanger 6D, there occurs a manually feelable entry of the projection 13D into the respective projections 12D.

This is especially desirable if the pipe clamp, for example, that is shown in FIGURE 8, includes a fastening device in the shape of the wall hook 27 so that all clamps of a given run of pipe can be arranged correctly and cemented in place and thereby avoid the necessity of making separate adjustments for the support components of indvidual pipe clamps. After the proper arrangement of all of the pipe clamps, the supporting components of each individual one thereof will be fastened tightly together by the crushing of the outer support part 10D, for example, by means of pliers.

In the pipe clamp with the radial support, whose support parts are constructed as cooperating profile members and are telescopically adjustable inwardly and outwardly of each other, there exists the further possibility that the supporting part can be manufactured from a weldable material and can thus be fixed with respect to each other by suitable heating, for example, by spot welding.

FIGURE 11 shows a pipe clamp constructed similarly to FIGURE 3 wherein, however, the radial support 6E, at the end thereof remote from the clamp portions, has bearing flanges 28 for lying against the lower flanges of the carrier rod 8E. The generally planar foot 7E, shown in FIGURE 11 and comprising with the carrier rod 8E one part of the bayonet joint, is in this embodiment fastened to the radial support 6E through a threaded bolt 29 which projects through a threaded opening in the planar foot 7E and extends through the hanger 6E in a lengthwise drection. The bayonet joint is closed in an already described manner by a 90° rotation of the planar foot within the recess of the carrier rod 8E. The foot 7E is provided on its side facing toward the support structure 6E with gripping surfaces for an appropriate tool. In the embodiment here illustrated, the engaging surfaces are provided with a slot 30 into which, for example, a screw driver may enter through the opening between the flanges of the carrier rod 8E. Such manner of fastening is advantageously applied to pipe clamps whose length is not to be altered.

The support 6F of the pipe clamp according to FIGURES 12 through 14 is provided with projections and apertures at the support components 10F and 11F which are formed by generally cylindrical threads 31 and 32 formed within the walls of the support components. Such an embodiment has not only the advantage of a very high mechanical strength through the multicplicity of threaded structure in engagement with each other, but it also makes possible the forming of an inner component 11F by a commercial threaded screw 33 for which the cylindically formed threads 31 and 32 serve as a guide.

In a similar manner, the support components 10G and 11G of the pipe clamp, according to FIGURES 15 to 17, are provided at the walls of the support with outwardly pressed notches 34 and 35 which constitute the apertures and projections. A cylindrical screw 36 can serve for the forming of the inner support component 11G, said screw entering from the pipe clamp side of the device into the interior of the support means in the direction of the arrows 37.

In FIGURES 16 and 17, it is shown that the support components 10G and 11G of the pipe clamp according to FIGURE 15 may comprise two identically formed parts 10a and 11a which are interengaged with each other. The said support parts 10a and 11a interengage each other by flanges 10b and 11b so that spot welding thereof is not necessary and a substantial saving of manufacturing cost is made possible.

Relative movement or displacement of the interengaged halves 10a can be prevented by providing a threaded screw 38 as a fastening means driven or otherwise received into the support surface 2G, the halves of an outer threaded means 39 being arranged around the screw 38 in the upper portion of the hanger halves 10a.

In the event it is not necessary that the clamp parts 3 should be made of two half shells 4 and 5 as set forth in the several figures, but instead that the clamping part 3 be made in a unitary manner and with sidewardly directed flange-like engaging means, the embodiments herein set forth of the pipe clamp still have special advantages in connection with the mounting thereof. As set forth particularly in FIGURES 1 and 8, the half shells 4 and 5 are connectible through a snap closure which constitutes a slot and angularly extending flanges aligned parallel to the edge of the shell in the direction of the pipe axis. Upon pressing together of the half shells 4 and 5, the flanges engage with and extend into the slot under elastic deformation of the half shells so that the opening and closing of the snap connection can be carried out without the necessity of special tools. On this basis, the pipe clamp consisting of two half shells 4 and 5 connectible together by snap closures when utilized in connection with a hanger 6 which is lengthwise adjustable and carries a bayonet closure part on the end 7 thereof remote from the shells, can be mounted simply and advantageously especially in connection with a support rod 8 having undercut cross-sectional profile according to FIGURE 1. As already earlier set forth the support 6 is lengthwise adjustable for the closing of the bayonet closure in the channel 9 of the support rod 8 and requires only a 90° rotation of the support 6 around its lengthwise axis in the position of use of the pipe clamp in order to fix same in position in the carrier rod 8. It is therefore possible to carry out the mounting of the tube 1 into the shells quickly and easily without special tools and yet in accurate adjustment perpendicularly and parallel to the support surface 2.

The drawings show only certain specific embodiments of pipe clamps according to the invention, which together with ordinary construction variations and all other construction details which can be derived from the drawings and corresponding descriptions are within the scope of the hereinafter appended claims.

The embodiments of the invention in which an exclusive property or privilege is claimed are defined as follows:

1. A clamp adapted for supporting a pipe, said clamp comprising:
   a support means extending substantially radially with respect to the longitudinal axis of said pipe, said support means including first and second support parts with said first support part being telescopically positionable within and longitudinally movable relative to the second support part;
   engagement means coacting between adjacent walls of said first and second support parts and adaptable for permitting said first and second support parts to be locked in various positions;
   said engagement means comprising a plurality of recesses formed in the wall of one of said support parts and a projection interconnected to the wall of the other support part and adapted to be received within one of said recesses;
   the improvement wherein said first and second support parts are initially provided with a clearance space between the adjacent walls thereof when said first part is telescopically received within said second part for permitting free relative longitudinal movement therebetween, said projection being freely longitudinally movable within said space whereby engagement of said projection with one of said recesses is prevented, one of said adjacent walls being deformable is a direction toward the other said adjacent wall for reducing the space therebetween and causing said projection to engage one of said recesses for locking said first and second support parts in a fixed relationship.

2. A clamp as defined in claim 1 wherein:
   a threaded member is positioned within said support means for causing said deformable wall to be deformed in the direction of the other said adjacent wall for causing said projection to engage with one of said recesses.

3. A clamp as defined in claim 2 wherein:
   said threaded member extends in a longitudinal direction through said support means with the end thereof extending beyond the end of said support means remote from said pipe, said extending end having a fastening means thereon for permitting said support means to be fixedly secured to a support surface.

4. A clamp as defined in claim 1 wherein:
   the adjacent wall of said one support part having the recesses therein is provided with a crease extending in the longitudinal direction of said part, said recesses being positioned in the vicinity of said crease so as to facilitate deformation of said wall.

5. A clamp wall as defined in claim 1 wherein: the wall of the one support part having the recesses therein is provided with a longitudinal slot in the vicinity of said recesses for facilitating deformation of said wall.

6. A clamp as defined in claim 1 wherein: the wall having the projection thereon is constructed in the form of a bendable cantilevered plate supported along one edge thereof and having said projection fixedly secured along the opposite edge thereof.

7. A clamp as defined in claim 1 further including: a shell structure comprising two half shells, and lock means for interconnecting said half shells; said support means being connected to one of said half shells at one end thereof, the other end of said support means having a bayonet-type fastening means formed on the end thereof; a support rail adapted to be secured to a support surface, said support rail having an undercut cross-sectional profile forming a bayonet-type fastening means; said bayonet-type fastening means on the end of said support means being receivable within the undercut of said support rail and being lockable into a position of use by a relative rotation of the support means about its longitudinal axis with respect to said support rail.

References Cited

UNITED STATES PATENTS

| | | | |
|---|---|---|---|
| 1,158,633 | 11/1915 | Carpenter et al. | 248—59 |
| 1,576,307 | 3/1926 | Casey | 248—59 |
| 2,924,414 | 2/1960 | Tesdal | 248—188.5 XR |
| 3,061,254 | 10/1960 | Piasecki | 248—74 |
| 3,164,351 | 1/1965 | Rembowski | 248—188.5 |
| 3,208,560 | 9/1965 | Cate | 248—59 XR |

ROY D. FRAZIER, *Primary Examiner.*

J. F. Foss, *Assistant Examiner.*